Sept. 12, 1939.   E. M. PITCHER   2,172,450
EDUCATIONAL TOY CLOCK DIAL
Filed May 14, 1938
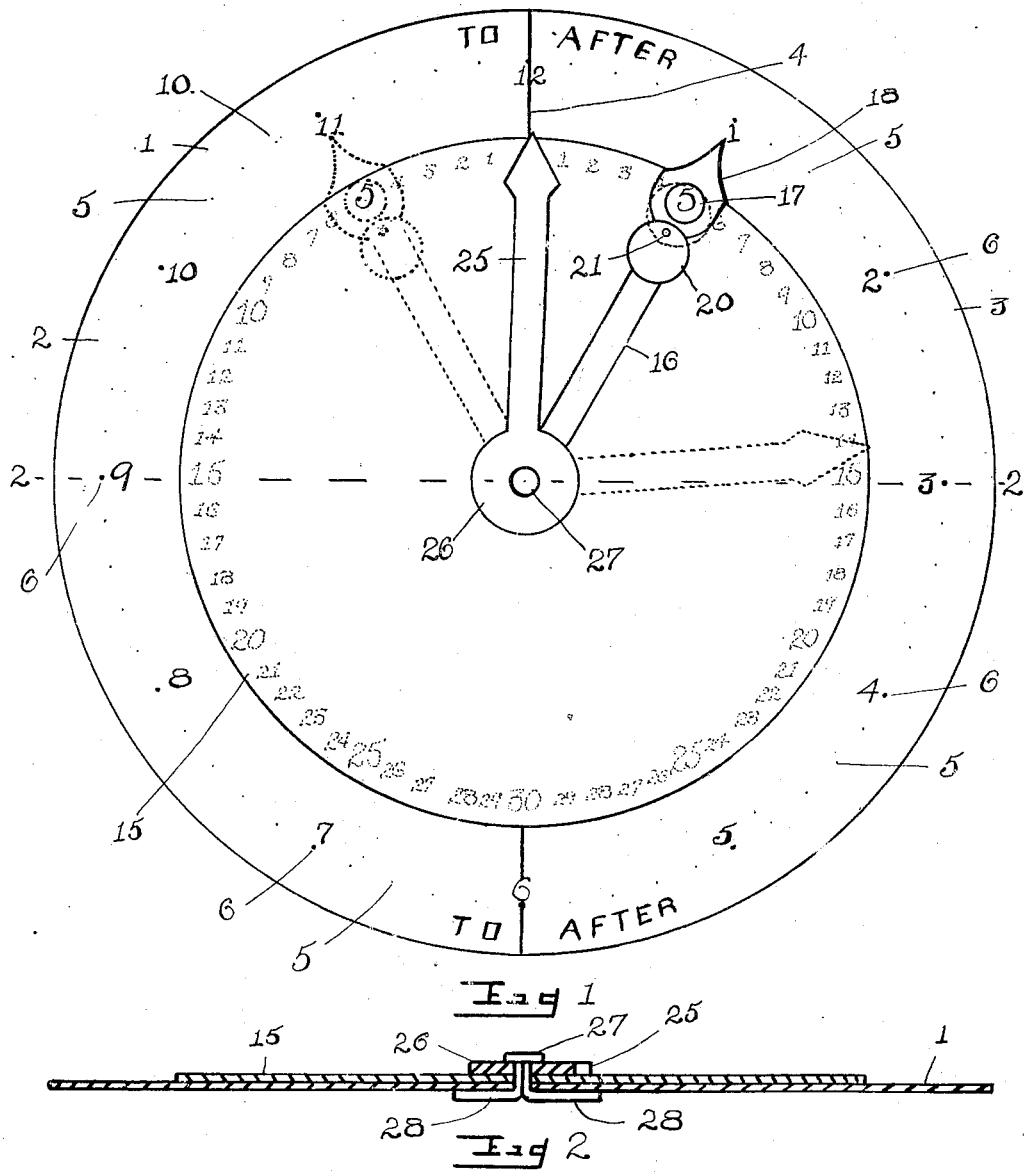
Inventor
EDITH M. PITCHER
By Thomas L. Wilder
Attorney Patented Sept. 12, 1939

2,172,450

UNITED STATES PATENT OFFICE 2,172,450

EDUCATIONAL TOY CLOCK DIAL

Edith M. Pitcher, Utica, N. Y.

Application May 14, 1938, Serial No. 207,946

3 Claims. (Cl. 35—39)

My invention relates to an educational toy clock dial and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a simple device for teaching children how to tell time. The device will be found particularly useful in the home for individual instruction and in the schools where a whole class of children can be taught from a single device.

Furthermore, the device combines the element of a toy with such educational purpose aforementioned.

The toy element appeals to the child's natural instinct to discover mysteries and his desire to manipulate movable objects to unlock secrets.

The object will be understood by referring to the drawing in which—

Fig. 1 is a plane view of the device.

Fig. 2 is a central vertical section taken on the line 2,2 of Fig. 1.

Referring more particularly to the device it embodies a plate or dial 1 made preferably of cardboard, wood or other suitable material. One of the surfaces of dial 1 has a conventional clock face represented thereon. The clock face is divided into two equal segments 2 and 3 by a diameter line 4 passing through the hour numerals 12 and 6 hereinafter mentioned. Said segments 2 and 3 are colored with any two contrasting colors such as pink and green.

The conventional clock face comprises the hour numbers 1 to 12 and the minute dots 5. Certain of the minute dots 5 opposite the hour numbers or in multiples of 5 are slightly enlarged at 6 to conform to the conventional clock face. The minute dots 5 and 6 and hour numerals 1 to 12 are arranged in a circle 10 near the periphery of dial face 1.

The means for denoting the significance of minute dots 5 and 6 embodies the numerals 1 to 29 on the right hand segment 3, numerals 29 to 1 on the left hand segment 2 and numeral 30 opposite hour number 6 and bridging the dividing line 4. Said numerals 1 to 30 and 29 to 1 are located on a circle within and concentric to the minute dots 5 and 6 and hour numerals 1 to 12 on circle 10, whereby every minute of the hour is represented by a number. There is no numeral or other indicia on the dividing line 4 just below the hour number 12 for none is needed at this location. The numerals 1 to 29 on the right hand segment 3 are located opposite their respective minute dots on the conventional clock face, likewise numerals 29 to 1 on the left hand segment 2 are located opposite their respective minute dots. The minute number 30 bridging the dividing line 4 is located opposite its respective minute dot on the hour number 6. The numbers 1 to 29 on the right hand segment 3 will denote the number of minutes after the hour, whereas the minute numbers 29 to 1 on the left hand segment 2 will denote the number of minutes to the hour. The minute number 30 represents either the minutes after the hour or to the hour.

Moreover, the means for distinguishing between the number of minutes after the hour and the number of minutes to the hour consist in addition to the color scheme heretofore mentioned of using the word "After" printed along the periphery, of the right hand segment 3 and the word "To" printed along the periphery of the left hand segment 2 or in any other suitable location adjacent the dividing line 4, whereby to indicate the numbers of minutes after and to the hour.

The means for indicating any particular time on the clock face 1 embodies a second or auxiliary rotary disc 15 made preferably of cardboard, wood or other suitable material and of a different color from either of the two segments 2 and 3, such, for instance, as brown. It rotates independent of clock face 1.

Disc 15 is of smaller diameter than dial 1 but sufficiently large to cover the minute numerals 1 to 30 and 29 to 1 respectively. A minute hand 16 is represented by the color black on disc 15. An aperture 17 is made in rotary disc 15 at the pointer portion 18 of said hand 16, whereby to expose severally the numerals 1 to 30 and 29 to 1 representing the minutes of the hour therebeneath. Portion 18 of hand 16 extends a little beyond the peripheral edge of rotary disc 15.

The minute numbers 1 to 30 and 29 to 1 are in alignment with the corresponding minute dots 5 and 6 respectively. This alignment of numbers 1 to 30, 29 to 1 and the dots 5 and 6 allows the minute hand 16 to disclose or register through opening 17 therein the number representing the minutes after or to the hour corresponding to the minute dots 5 and 6. In as much as the minute dots 5 and 6 are not designated by numerals on the conventional clock face, this arrangement of the numbers 1 to 30 and 29 to 1 under the auxiliary disc 15 and their individual exposure through aperture 17 will teach the child the significance of the minute dots 5 and 6.

A slide cover 20 is pivoted at 21 to minute hand 16. It is mounted on the upper surface of said minute hand 16 and is adapted to be pushed over aperture 17 to close the same, whereby to conceal at will the minute numerals below auxiliary disc 15. This closure of aperture 17 will convert the dial into the conventional clock face, whereby the instructor or child will be able to test the child's ability to tell time without the aid of the minute numbers above mentioned.

An hour hand 25 colored black and shorter than minute hand 16 is mounted above auxiliary rotary disc 15 and turns independently of both disc 15 and dial plate 1. It has a large central part 26 with an aperture therein for the projection of a cotter or fastener pin 27, which projects down through disc 15 and dial plate 1. The shank of pin 27 is split, whereby to form the parts 28, 28. The outer surface of parts 28, 28 are round or they may be flat. Its free ends 28, 28 are bent back against the lower surface of dial face 1. Pin 27 acts as a pivot or axle on which both disc 15 and hour hand 25 turn for determining any given time.

In operation the child may handle the device to instruct himself or the teacher may take it and turn disc 15 and hour hand 25 to educate the child in telling time. For instance, the instructor may turn disc 15, whereby the minute hand 16 points to number 12 and then turn the hour hand 25, whereby it likewise points to the hour number 12. Both hands are now indicating the hour of 12. The instructor may then move the disc 15, whereby the minute hand 16 points to the hour numeral 1 and uncover the minute numeral 5 through aperture 17. The hour hand 25 will be moved one-twelfth the distance between the hours 12 and 1, whereby the indicate five minutes after 12 or the instructor may move the minute hand 16 to the hour 11 and the hour hand 25 to very nearly the hour 3 or eleven-twelfths the distance between 2 and 3 to indicate five minutes to 3.

In like manner the instructor may move the minute hand 16 and hour hand 25 to any combination of positions desired, whereby to give the child a thorough instruction in telling time.

After thus instructing the child the teacher may test the pupil's knowledge by moving the cover 20 over aperture 17 in the minute portion of disc 15, whereby to conform the device to the conventional clock face and then move the minute and hour hands to different positions to test the child's knowledge when the minute numerals are completely covered or concealed below disc 15.

Having thus described my invention what I claim as new and desire to secure by Letters Patent is as follows:

1. In an educational toy clock dial, a member having a conventional clock face thereon, numbers representing minutes on said clock face, another member having a minute hand indicated thereon, an aperture made in said second named member through said minute hand, to expose successively the minutes on the clock face, whereby to tell the number of minutes after and to the hour, a member for closing said aperture in said second named member, whereby to test the child's knowledge, and an hour hand pivotally mounted to said clock dial, whereby to denote the hours on said dial.

2. In an educational toy clock dial, a member having a clock face indicated thereon, a series of numbers representing minutes and hours arranged in an outer circle on said clock face, a second series of numbers representing minutes after and to the hour arranged in an inner circle concentric with said first named series of numbers, a disc member having a minute hand indicated thereon, an aperture made in said disc member through said minute hand to expose successively the numbers representing minutes after and to the hour, and a hour hand pivotally mounted to said clock dial above said disc-member, whereby to denote the hours on said clock dial.

3. In an educational toy clock dial, a member having a clock face indicated thereon, a series of numbers representing minutes and hours arranged in an outer circle on said clock face, a second series of numbers representing minutes after and to the hour arranged in an inner circle concentric with said first named series of numbers, a disc member having a minute hand indicated thereon, an aperture made in said disc member through said minute hand to expose successively the numbers representing minutes after and to the hour, a member for closing said aperture in said clock dial, whereby to convert said clock dial into a normal clock dial to test the child's knowledge, and a hour hand pivotally mounted to said clock dial above said disc member, whereby to denote the hours on said clock dial.

EDITH M. PITCHER.